United States Patent [19]

Patsiokas et al.

[11] Patent Number: 5,461,558
[45] Date of Patent: Oct. 24, 1995

[54] METHOD AND APPARATUS HAVING TIME DEPENDENT SLEEP MODES

[75] Inventors: Stelios J. Patsiokas, Plantation, Fla.; Ronald L. Bane, Stone Mountain; James M. Barlow, Lawrenceville, both of Ga.

[73] Assignee: Motorola, Inc., Schaumburg, Ill.

[21] Appl. No.: 228,764

[22] Filed: Apr. 18, 1994

[51] Int. Cl.$^6$ .......................... G05B 11/01; G08C 15/06; H04R 1/16
[52] U.S. Cl. .................. 364/145; 364/143; 340/870.03; 340/309.4; 455/53.1; 455/68; 455/343
[58] Field of Search ..................... 364/140, 143, 364/145, 483, 492; 340/870.02, 870.03; 379/106, 107; 455/49.1, 53.1, 54.1, 67.1, 68, 70

[56] References Cited

U.S. PATENT DOCUMENTS

| | | | |
|---|---|---|---|
| 4,423,484 | 12/1983 | Hamilton | 364/420 |
| 4,698,748 | 10/1987 | Juzswik et al. | 364/70.7 |
| 4,811,011 | 3/1989 | Sollinger | 340/870.02 |
| 4,860,005 | 8/1989 | DeLuca et al. | 340/825.46 |
| 4,862,493 | 8/1989 | Nenkataromen et al. | 379/107 |
| 4,866,761 | 9/1989 | Thornborough et al. | 379/107 |
| 5,079,715 | 1/1992 | Venkatgraman et al. | 364/481 |
| 5,083,266 | 1/1992 | Watanabe | 395/275 |
| 5,196,728 | 3/1993 | Jaux | 307/10.1 |

*Primary Examiner*—Paul P. Gordon
*Attorney, Agent, or Firm*—Andrew S. Fuller

[57] ABSTRACT

A remote meter reading system (10) includes a group of meter interface units in which each meter interface unit (12) operates between periods of activity and inactivity. The meter interface unit has stored first (400) and second (500) operational schedules, and a third schedule (600) which is used to determine whether to use the first (400) or second (500) schedule. The first (400) and second (500) schedules inform controller (26) when to provide a control signal to power control circuit (27) in order to stop the flow of battery energy from battery (25) to communication unit (24). Thereby, conserving valuable battery energy during those periods of time when the meter interface unit (12) is not likely to be interrogated by meter reading device (15).

12 Claims, 4 Drawing Sheets

FIG.4
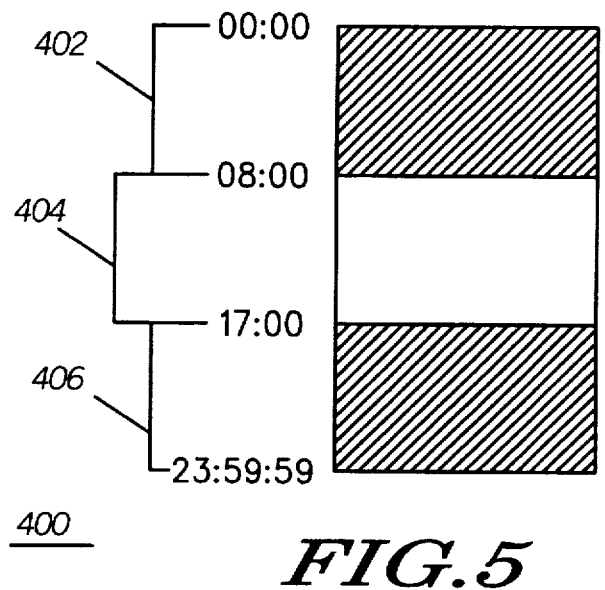
FIG.5
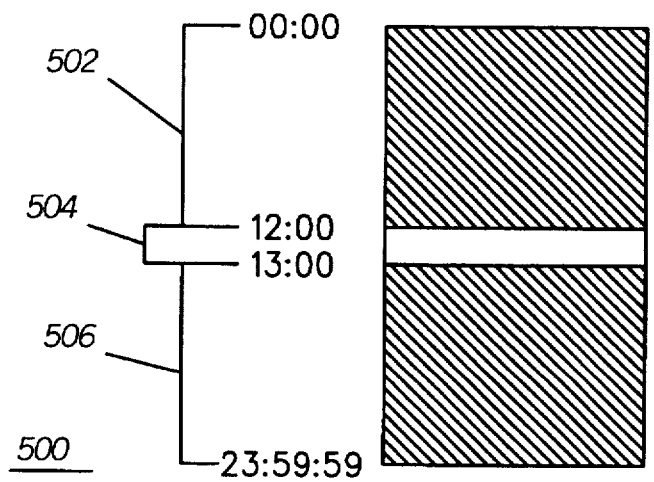
FIG.6
FIG.9
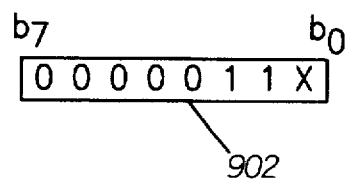

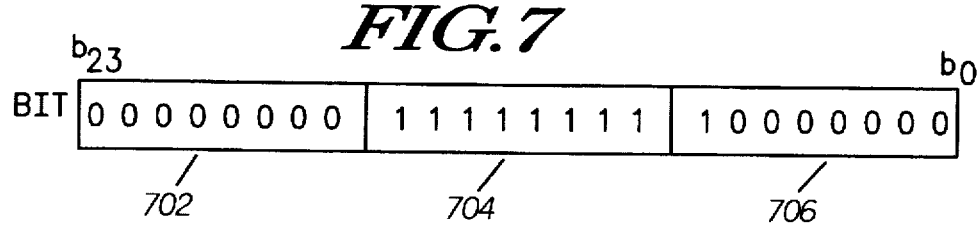
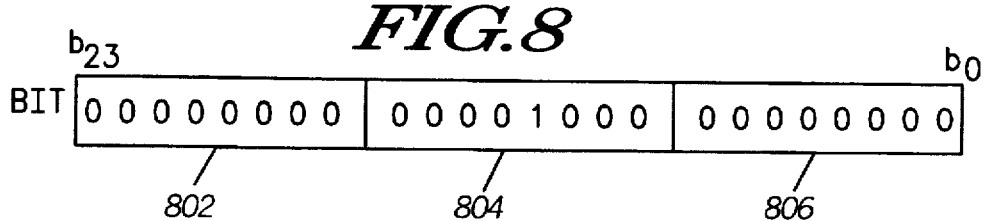
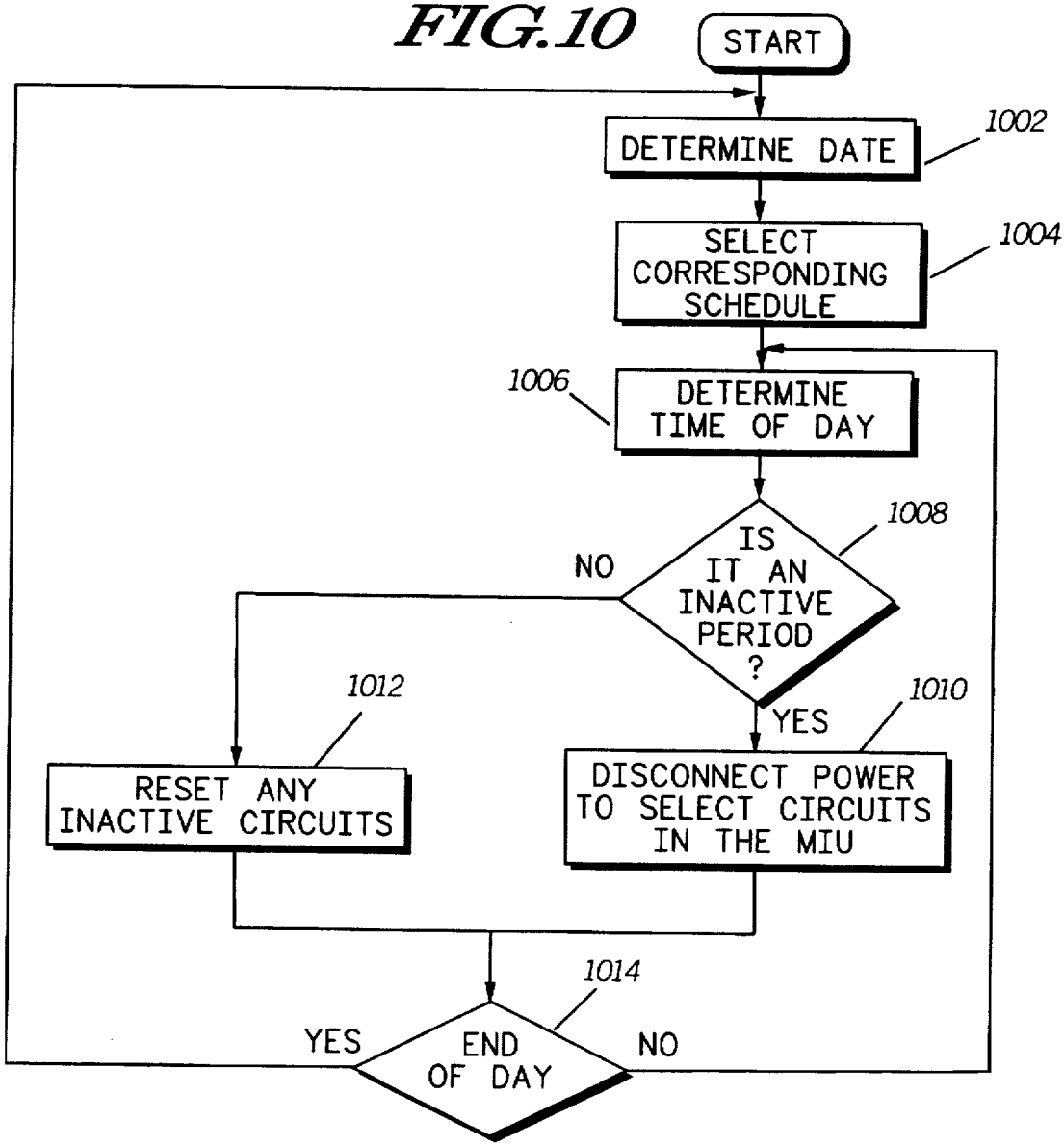

METHOD AND APPARATUS HAVING TIME DEPENDENT SLEEP MODES

TECHNICAL FIELD

This invention relates in general to remote meter systems, and more specifically to a remote meter system having time dependent sleep modes and method for providing the same.

BACKGROUND

There has been a strong interest on the part of utility companies, and similar entities, to take advantage of modern technology to reduce costs and increase efficiency in meter reading applications. Traditionally, meters, such as electric, water, and gas meters, have been manually read by a person physically reading each meter. However, recent developments have provided for meters which can be remotely accessed from a central location through wire or wireless (e.g., radio frequency, etc.) communication links. Oftentimes, these remotely accessible meters have battery powered meter interface devices which can access the meter status information, and which can communicate via radio frequency signals the meter status information to a remotely situated meter reading device. In such cases, issues associated with power consumption management are an important concern in a remote meter reading system since the meter interface devices in the system are typically battery operated.

In a typical operational environment, a meter reading system includes a large number of meter installations. Low maintenance battery-operated meters are desirable to facilitate operating efficiency and to reduce maintenance costs. Therefore, it is desirable to have a meter interface device which can operate for an extended period of time without requiring frequent maintenance for battery replacement and the like. Such maintenance requirements may be reduced by increasing battery capacity or by reducing power consumption. The more viable option of reducing power consumption at the battery powered meter interface unit is usually pursued. For example, the meter interface device may be placed in a sleep or low power operating mode when there is no ongoing communication with a meter reading device. A trade off is usually made between the availability of the meter interface device for communications with the meter reading device and the amount of power consumption savings which can be achieved. A meter interface device employing a power consumption saving technique may not be able to communicate with the remote meter reading device given that the radio circuitry or sections of circuitry in the meter interface unit may be shut-off when the unit is in the sleep mode in order to conserve the unit's battery energy.

There exists a need for a meter reading system and method in which meters can be read without worrying whether the unit is in a non-communication state (i.e., sleep mode) but yet can provide the remote meters with improved battery savings.

BRIEF DESCRIPTION OF THE DRAWINGS

FIG. 4 shows a first active/inactive schedule in accordance with the invention.

FIG. 5 shows a second active/inactive schedule in accordance with the invention.

FIG. 6 shows a daily schedule in accordance with the invention.

FIG. 7 shows the first active/inactive schedule in a 3-byte format in accordance with the invention.

FIG. 8 shows the second active/inactive schedule in a 3-byte format in accordance with the invention.

FIG. 9 shows a weekly schedule using a one byte format in accordance with the invention.

FIG. 10 shows a flowchart of the steps taken when using the time dependent sleep mode of the present invention with the meter interface unit of FIG. 2.

DETAILED DESCRIPTION OF THE PREFERRED EMBODIMENT

Generally, the present invention provides for a remote meter reading system including a remote meter reading device, or master unit, and a group of remotely located meter interface units, or target units. The meter reading device and the remotely situated meter interface units are capable of communicating with each other. In this meter reading system, the remote meter interface units have a power consumption management system which allows each meter interface unit to operate in a reduced power consumption mode (also known as a sleep or inactive mode). The remote units achieve power consumption savings by alternating between active and inactive states. While in an inactive state there is no communication capability in the preferred embodiment. However, the remote units are periodically activated to enable communications capabilities, and during such period, the remote units are responsive to communication signals initiated by the remote meter reading device.

Figure 1:
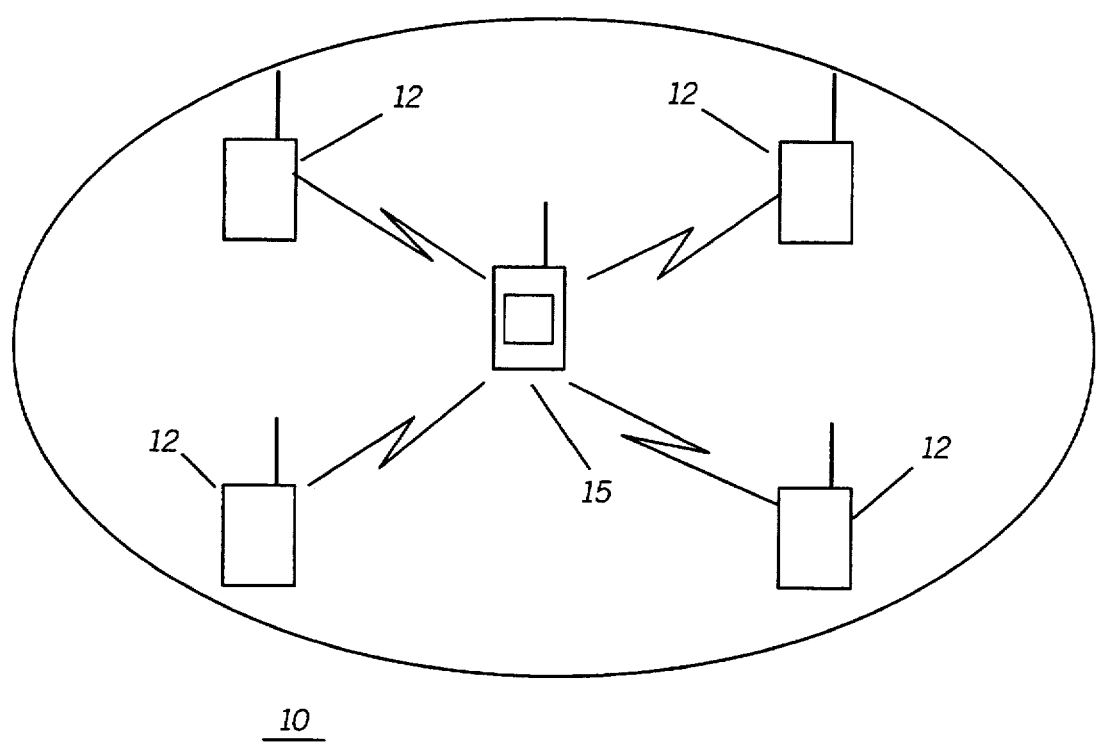
FIG. 1 shows a representation of a remote meter reading system in accordance with the present invention.

Referring now to the drawings and specifically to FIG. 1, there is shown a representation of a remote meter reading system 10 in accordance with the present invention. The system includes at least one meter reading device 15, and a group of remotely located meter interface units 12. The meter reading device 15 is situated such that it is in within communication range of the group of meter interface units 12.

Figure 2:
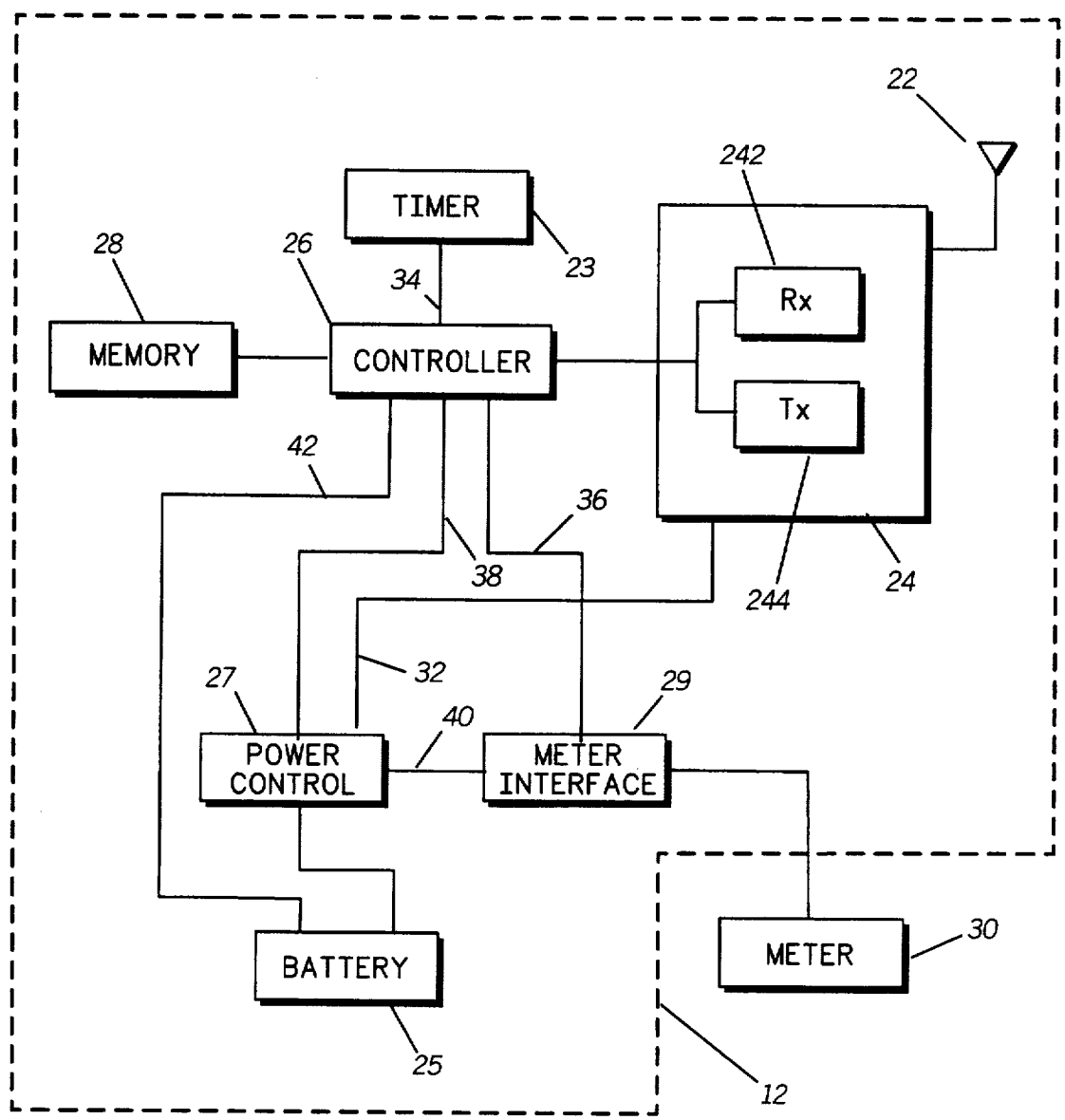
FIG. 2 shows a block diagram of a meter interface unit attached to a meter in accordance with the present invention.

In FIG. 2, a block diagram of a meter interface unit 12 is shown in accordance with the present invention. The meter interface unit 12 provides an interface for reading a meter 30, such as an electricity meter, a water meter, a gas meter, or other similar devices. Additionally, the meter interface unit 12 provides remote access to the functions of the meter 30 (e.g., amount of electricity consumption measured by the meter, etc.). The meter interface unit 12 includes a controller 26, memory section 28, a radio frequency transceiver 24, a meter interface portion 29, timer circuit 23, battery 25, and power control section 27. Controller 26 is implemented using a well known microprocessor or microcontroller as known in the art. The meter interface portion 29 is electrically coupled to meter 30 and provides access to the functions of the meter. In most applications, meter interface portion 29 takes information from meter 30 and provides the meter information to controller 26 so that it can then send the information to meter reading. The design of meter interface portion 29 will depend on the type of meter 30 which will be interfaced. Typically, meter interface circuit 29 will comprise a conventional serial digital interface which is used to acquire the digital information provided by meter 30. The power control section 27 controls the battery power supplied from battery 25 to select circuitry in meter interface unit 12 and facilitates the operation of power consumption management. Memory section 28 preferably includes random access memory (RAM), read-only memory (ROM), etc.

Radio frequency (RF) transceiver 24 is capable of receiving and transmitting communication signals over a communication channel, such as a RF channel via antenna 22, using well-known principles. Transceiver 24 can comprise a conventional frequency modulated (FM) transceiver as is well known in the art. The controller 26 uses the information such as software programs, etc. stored in the memory block 28 to control the overall operation of the meter interface unit 12. The controller 26 is electrically coupled to the RF transceiver 24 and provides the overall control for the RF transceiver 24. For receive operations, communication signals are received by the antenna 22 and are selectively processed by the receiver 242. Similarly, for transmit operations, communication signals are processed by the transmitter 244 and radiated through the antenna 22. The memory block 28 can store information received by the meter interface unit 12, such as information sent by meter reading device 15.

The meter interface unit 12 is operable in an inactive or battery saving state to reduce power consumption. In the inactive state, select circuitry in the meter interface unit 12 have battery power to them shut-off, in order to conserve the battery capacity of battery 25. Preferably, meter interface unit 12 is periodically operable in an activated or operational state in order to monitor its RF communication channel for channel activity directed at the meter interface unit 12. The communication portion 21 is activated by power supplied under the control of the power control circuit 27. Timer 23 provides a conventional time base which communicates with controller 26 via bus 34. Timer circuit 23 activates the controller 26 at specific time intervals, preferably either at 8 or 512 second intervals. Real time is approximated by the controller 26 using this time base provided by timer circuit 23. The power control circuitry 27 is controlled by the controller 26 which also has overall control of meter interface unit 12. Battery power is provided directly to controller 26 via power line 42 since controller 26 has to have power available to it at all times. In order to conserve even more battery energy, controller 26 can also be placed in a reduced current mode (which is available on many conventional microprocessors) during select periods of time.

The controller 26 provides the battery saving control signal to power control circuit 27 via bus 38. Upon receipt of the control signal, the power control circuit 27 supplies power to the transceiver 24 from the electrically coupled battery 25 via power bus 32. When the control signal is removed, battery 25 is disconnected from transceiver 24, thereby reducing the meter interface unit's current drain. Controller 26 communicates with meter interface circuit 29 via bus 36. Battery energy is supplied from battery 25 to controller 26 via power bus 42 and to meter interface unit 29 via power bus 40. Depending on the amount of battery conservation desired, all circuits except for controller 26 and timer 23 can be shut-off from battery power in order to conserve energy during battery saving periods.

The meter interface unit 12 is responsive to messages received over the monitored radio frequency communication channel at receiver 242. The received message may include specific commands which require a response from the meter interface unit 12. These commands include wake-up requests or activation signals, meter reading requests (e.g., meter reading device 15 requesting meter data from meter 30, such as how much electricity consumption has occurred, etc.), and requests for storing updated daily or hourly schedules, etc. The meter interface unit 12 responds to a wake-up request by operating in an activated state for an extended time period. In response to a meter reading request, the meter interface unit 12 communicates with meter 30 through the meter interface portion 29 to extract status information from the meter 30. The meter status information can then be transmitted via transmitter 244 to meter reading device 15. In the situation where a request for storing a group identifier is received, the meter interface unit 12 stores the group identifier in the memory block 28. In the preferred embodiment, the meter interface unit 12 responds to meter reading requests with status information for the meter, along with a group identifier representing the group to which the meter interface unit 12 belongs.

Figure 3:
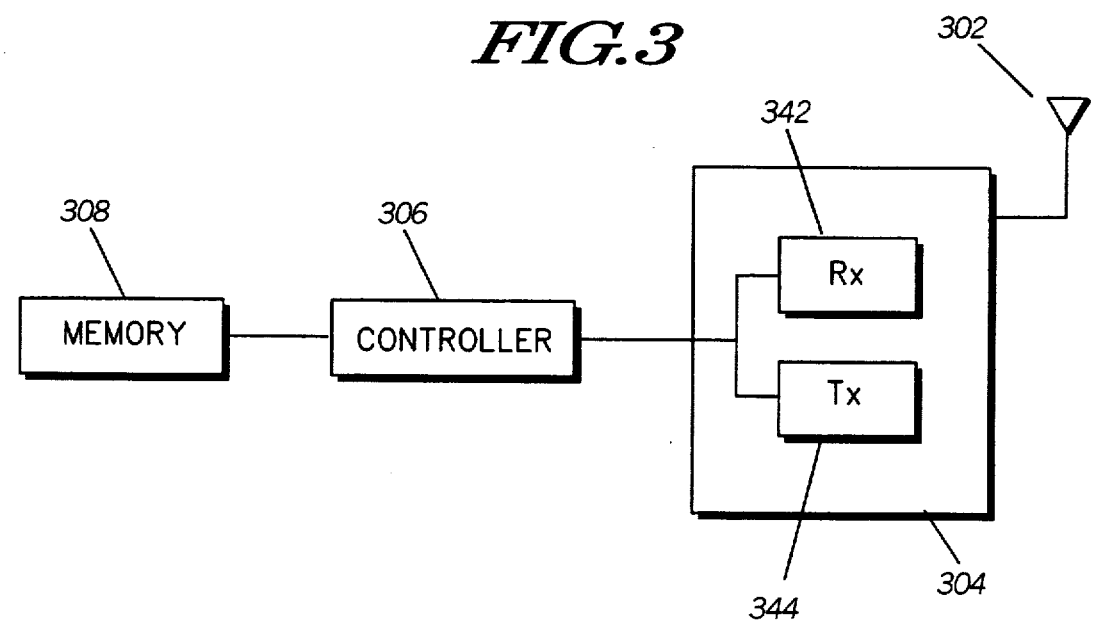
FIG. 3 shows a block diagram of a meter reading device in accordance with the present invention.

Referring to FIG. 3, a block diagram of a meter reading device 15 is shown in accordance with the present invention. The meter reading device 15 has communications capability similar to those described with respect to the meter interface unit 12. Accordingly, the meter reading device 15 has a controller 306, a memory block 308, and a RF portion 304, including a receiver 342 and transmitter 344, for providing two-way communications through an antenna 302. The memory block 38 provides storage capability for the meter reading device 15. Data is stored in the memory block 38 for facilitating the operation of the meter reading device 15. This data may include addresses, or unit identifiers, for the meter interface units 12, group identifiers for the meter interface units 12, and other information needed to facilitate the meter reading system 10. Data may be pre-programmed in the meter reading device 15, or the data may comprise information, which is provided remotely via meter reading device 15, such as providing updated daily or hourly schedules over the air. The meter reading device 15 is capable of initiating communication with the group of remotely situated meter interface units 12 over one or more communication channels or radio frequency channels.

The meter reading device 15 initiates communications by transmitting a read request addressed to a specific or target meter interface unit 12 or a group of meter interface units. The meter reading device 15 then waits to receive a message from the meter interface units 12. The message sent by meter interface unit 12 contains meter status information. The meter reading device 15 is also capable of transmitting over the radio frequency communication channel to a group of meter interface units 12, a message containing a wake-up request, along with a group identifier in order to activate for an extended time, the group of meter interface units 12. Although not shown, the meter reading device of FIG. 3 can also include a display and keypad to allow the user more access to information from the remote meter interface devices 12 which are to be read.

Referring to FIG. 4, a first operational schedule showing when a particular meter interface unit 12 will be active or inactive in accordance with the present invention is shown. The first operational schedule is preferably stored in memory 28. During time period 402, shown as from midnight up to 8 a.m., the meter interface unit 12 will be in a sleep or inactive mode. During time period 404, shown as from 8 a.m. to 5 p.m. (17:00 if represented in a 24 hour clock mode), the meter interface unit 12 will be in a wake-up or active mode, ready to receive communication messages from meter reading unit 15. Finally, anytime after 5 p.m. and before midnight 406, the meter interface unit again will be in the sleep mode.

In FIG. 5, a second operational schedule for the meter interface unit 12 is shown. During periods 502 and 506 the meter interface unit 12 is in a sleep or inactive mode, while in period 504, the meter interface unit 12 is in an active mode waiting for any messages from meter reading device 15. The first active/inactive meter interface unit operating schedule 400 provides for a longer active time period 404, while the second active/inactive meter interface unit operating schedule 500 provides for less active time, and therefore more battery savings. Both the first and second operational schedules shown in FIGS. 4 and 5 are stored in memory section In accordance with the invention, a third or day of cycle schedule as shown in FIG. 6 which is also stored in memory 28 is used to determine which of the two operating schedules 400 or 500 to use during a given day of the battery saving cycle. For example, schedule 600 is shown as a daily schedule which shows that during the weekdays 602 (Monday through Friday) the meter interface unit will operate using the first operating schedule 400, while on the weekend days 603 (Saturday and Sunday) the second operating schedule 500 will be utilized. On the days of the week in which the remote meter would be most likely be read by meter reading device 15, the meter interface unit 12 stays in the active mode for a longer period of time in order to allow the meter reading device 15 an ample opportunity to remotely check the status of meter interface units 12. During the weekend or non-business days, the meter interface units 12 are kept in a longer sleep or inactive state so as to conserve the maximum amount of energy from battery 25. This also allows for a period of time during each day in which all the meters in the system can be accessed, such as when an emergency situation occurs which requires access to the meter interface units. Instead of using a daily schedule as shown in FIG. 6, alternate representations of the daily cycle schedule can include day of the month or even day of customer billing cycle schedules.

Operationally, controller 26 sends a control signal to power control circuit 27 which informs power control circuit 27 whether to supply the battery energy from battery 25 to RF transceiver 24 or other selected circuits in meter interface unit 12 or not. During the active periods, controller 26 provides the control signal to power control circuit 27 which allows for the flow of energy from battery 25 to transceiver via power bus 32. Power control circuit 27 can be preferably implemented using a conventional switching power transistor. During times of inactivity, as determined by the schedules in FIGS. 4 and 5, controller 26 stops providing the control signal to power control circuit 27 via bus 38, which causes power control circuit 27 to block the flow of battery energy via bus 32 to RF transceiver 24.

The types of schedules, such as those shown in FIG. 4 and 5, used in a particular system will depend on such factors such as the amount of access to meter information that is required, how many times such meter information is required, etc. Different types of day of cycle such as the daily schedule shown in FIG. 6 can also be designed, such as a monthly schedule, a yearly schedule, etc. Since, the schedule information is stored in memory 28 or in the alternative in timer circuit 23, it is preferable to cycle the schedules in order to reduce the amount of storage space required, if possible. For example, the weekly schedules shown in FIGS. 4 and 5 can be cycled once the end of each week is reached.

Although the hourly/daily schedules shown in FIGS. 4, 5 and 6 are preferably stored internally in memory 28, they could also be acquired or updated via the meter reading device 15. For example, the schedules 400, 500 and 600 could be updated (modified) remotely by meter reading device 15. This could be done by meter reading device downloading information to meter interface unit 12. In order to minimize the storage space required and the air-time required to transfer the desired schedules, the schedules are preferably represented as follows: with hourly resolution, the first hourly schedule shown in FIG. 4 can be represented as shown in FIG. 7 using 3 bytes of information 702, 704 and 706, with the most significant bit, $b_{23}$ representing the hour from midnight until 1 a.m., bit $b_{22}$ representing the hour from 1 a.m. until 2 a.m., etc. A zero ("0") in a bit location represents an inactive state (unit in sleep mode) while a one ("1") represents the active state. In the active state transceiver 24 is provided with battery power. The second hourly schedule shown in FIG. 5 is shown in byte format in a three byte 802, 804 and 806, with bit b11 representing the hour in which the meter interface unit is fully operational. Similarly, for the daily schedule 600, shown in FIG. 6, each bit would represent one particular day. If using a weekly period as shown in FIG. 6, the schedule can be represented in a single byte as shown in FIG. 9.

In FIG. 9, a zero in a bit location represents the first schedule (shown in FIG. 4), while a one in a bit location represents the use of the second schedule (shown in FIG. 5). Bit 7 in FIG. 9, represents Monday, on down to Sunday in bit 1, with bit zero not used (shown as an "X").

Referring now to FIG. 10, a simplified flow chart showing the steps taken by the meter interface unit 12 in order to provide for increased battery savings in accordance with the invention is shown. In step 1002, the meter interface unit 12 determines the day of cycle information (e.g., day of week, month, etc.), this is accomplished by the controller 26 reading the day of cycle schedule (e.g., the schedule shown in FIG. 6) stored in memory section 28. For a weekly schedule as shown in FIG. 6, the day of cycle schedule matches to the day of week. In a 30 day cycle, the day of cycle nearly matches (but not exactly) the day of the month since some months have more or less days than 30.

Alternatively, a real-time clock could be provided as part of timer circuit 23 or controller 26 in which case the schedules used would be more precise at the cost of a slightly more expensive meter interface unit 12.

Once the day of cycle (e.g., day of week, day of month, day of billing cycle, etc.) is determined in step 1002, the corresponding activity/inactivity schedule is selected in step 1004. In the preferred embodiment, this is accomplished by the controller 26 determining based on the weekly byte shown in FIG. 9, which is stored in memory 28, which schedule, either the first schedule shown in FIG. 4 or the second schedule shown in FIG. 5, to use. Once the correct schedule which will be used for the day is selected, the timer determines the time of day in step 1006. Then in step 1008, the controller 26 determines whether the transceiver 24 should be in an active or inactive state.

If the time is one of inactivity, in step 1010, the controller 26 sends a control signal to power control circuit 27 via line 38 informing the power control circuit to shut of power from battery 25 to transceiver 24. If in step 1008, it is determined that it is a period of activity based on the selected schedule, the controller 26 stops sending the control signal to power control circuit 27. This causes energy to flow from battery 25 to transceiver 24. At step 1014, it is then determined whether the end of the day has been reached. If the end of the day has not been reached, the process returns to step 1006. If the end of the day has been reached, the process returns to step 1002, where the procedure determines whether a new daily schedule will be required.

Preferably, in order to further increase the accuracy of the system, the meter reading device 15 broadcasts the time of day information to the meter interface units 12 and the individual meter interface units 12 decide on adjusting their own internal time of day information based on this information. In this way the meter reading device 15 and the meter interface units can maintain their time of day information synchronized.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, the schedules used in FIGS. 4 and 5 can be broken down into minutes instead of hours, etc. More than two different schedules can also be used, for example, three or more, etc. Also, instead of using the time base provided by timer circuit 23, a built-in real time clock can be incorporated into controller 26 if the controller chosen includes real-time clock functions.

In summary, the present invention provides for improved battery savings while allowing the remote meter interface unit 12 the opportunity of being active in the times when the meter will be more likely be read by meter reading unit 15. This allows for the meter interface unit 12 to operate for longer periods of time without having to change the unit's battery pack 25. This cuts down on the amount of maintenance required to maintain these remote meter interface units 12 and therefore reduces the overall cost of operation.

What is claimed is:

1. A battery saving method for use in a battery powered meter interface unit which operates between an operational state and a battery saving state, the meter interface unit having a battery, the battery saving method comprising the steps of:

(a) determining day of cycle information;

(b) selecting an operational schedule from among a plurality of operating schedules based on the day of cycle information which has been determined in step (a);

(c) determining the time of day;

(d) determining using the selected operational schedule whether the meter interface unit should be placed in the battery saving state or in the operational state during the time of day which has been determined in step (c); and (e) placing the meter interface unit in the battery saving state if it is determined in step (d) that the unit should be in the battery saving state.

2. A battery saving method as defined in claim 1, wherein step (e) comprises the sub-step of:

(e1) disconnecting the battery supply from a select portion of the meter interface unit.

3. A battery saving method as defined in claim 1, wherein the step (b) comprises the sub-steps of:

(b1) comparing the day of cycle of determined in step (a) to information stored in a daily schedule;

(b2) using the information in the daily schedule to determine which from among the plurality of operating schedules to select.

4. A battery saving method as defined in claim 3, further comprising the steps of:

(f) repeating steps (c) and (d); and (g) placing the meter interface unit in the operational state if it is determined in step (f) that the unit should be in the operational state.

5. A battery saving method as defined in claim 4, wherein step (g) comprises:

re-establishing the connection of the battery supply to the select portion of the meter interface unit if it had been previously disconnected.

6. A battery saving method as defined in claim 1, wherein step (a) comprises determining the date of operation using a real-time clock.

7. A meter interface unit operable between an operational state and a battery saving state in which a select portion of the meter interface unit is placed in a battery saving condition, the meter interface unit comprising:

a battery;

a memory section having a plurality of operating schedules stored in the memory section;

a controller for determining day of cycle and time of day information, the controller in response to the day of cycle determined, selects an operating schedule from among the plurality of operational schedules stored in the memory section;

a power control circuit responsive to the controller for selectively connecting and disconnecting the battery from the select portion of the meter interface unit; and the power control circuit electrically disconnects power from the battery to the select portion of the meter interface unit if it is determined by the controller, based on information provided by the selected operating schedule and on the time of day information provided by the controller, that it is time to place the meter interface unit in the battery saving state.

8. A meter interface unit as defined in claim 7, wherein the select portion of the meter interface unit which is selectively placed in battery saving state comprises a radio frequency transceiver.

9. A meter interface unit as defined in claim 8, further comprising:

a date schedule stored in the memory section; and the date schedule is used by the controller to determine which from among the plurality of operational schedules to use on a particular date.

10. A remote meter reading system, comprising:

a meter interface unit operable between an operational state and a battery saving state, the meter interface unit including a radio frequency transceiver which is placed in a battery saving condition when the meter interface unit is in the battery saving state, the meter interface unit comprising:

a battery;

a memory section having a plurality of operating schedules stored in the memory section;

a controller for determining day of cycle and time of day information, the controller in response to the day of cycle determined, selects an operating schedule from among the plurality of operational schedules stored in the memory section;

a power control circuit responsive to the controller for selectively connecting and disconnecting the battery from the radio frequency transceiver; and the power control circuit electrically disconnects power from the battery to the radio frequency transceiver if it is determined by the controller, based on information provided by the selected operating schedule and on the time of day information provided by the controller, that it is time to place the meter interface unit in the battery saving state; and a meter reading device, comprising:
   a radio frequency transceiver for communicating with the meter interface unit.

11. A remote meter reading system as defined in claim 10, wherein the meter reading device upon establishing a communication link with the meter interface unit can modify the day and time of day information provided by the controller.

12. A remote meter reading system as defined in claim 10, wherein the memory section and controller are integrated into a microprocessor.

\* \* \* \* \*